US012330883B2

(12) United States Patent
Branner et al.

(10) Patent No.: US 12,330,883 B2
(45) Date of Patent: Jun. 17, 2025

(54) CENTERING STATION AND METHOD FOR HANDLING AT LEAST ONE LOAD CARRIER

(71) Applicant: Gebhardt Fördertechnik GmbH, Sinsheim (DE)

(72) Inventors: Fabian Branner, Waibstadt (DE); Günther Napetschnig, Hohenems (AT); Marco Gebhardt, Sinsheim (DE)

(73) Assignee: Gebhardt Fördertechnik GmbH, Sinsheim (DE)

( * ) Notice: Subject to any disclaimer, the term of this patent is extended or adjusted under 35 U.S.C. 154(b) by 0 days.

(21) Appl. No.: 18/089,658

(22) Filed: Dec. 28, 2022

(65) Prior Publication Data

US 2023/0202769 A1    Jun. 29, 2023

(30) Foreign Application Priority Data

Dec. 28, 2021  (DE) ...................... 10 2021 006 362.7

(51) Int. Cl.
*B65G 47/24*    (2006.01)
*B65G 21/20*    (2006.01)

(52) U.S. Cl.
CPC ......... *B65G 47/24* (2013.01); *B65G 21/2072* (2013.01)

(58) Field of Classification Search
CPC . B65G 1/10; B65G 1/026; B65G 1/08; B65G 1/0492; B65G 2201/0267;

(Continued)

(56) References Cited

U.S. PATENT DOCUMENTS 2,728,307 A * 12/1955 Rhodes .................. A21C 9/085
                                                        425/391
3,465,763 A *  9/1969 Hoffman ............... A47L 15/248
                                                        312/289

(Continued)

FOREIGN PATENT DOCUMENTS

AT          521509 B1 *  2/2020 ............. B65G 61/00
CN       108657706 A  * 10/2018 ............. A47B 96/16

(Continued)

OTHER PUBLICATIONS

European Search Report for EP22214896.7-1017 May 23, 2023.
German Office Action dated Oct. 10, 2022 related to German Patent Application No. 10 2021 006 362.7.

*Primary Examiner* — Gregory W Adams
(74) *Attorney, Agent, or Firm* — Fishman Stewart PLLC (57) ABSTRACT

A centering station may be used for correcting a position of a load carrier on a channel vehicle. A centering station may comprise a centering channel extending along a longitudinal direction, the centering channel comprising at least one running rail for the channel vehicle running in the longitudinal direction and at least two centering means extending substantially in the longitudinal direction above the at least one running rail. In embodiments, the centering channel may comprise an entrance which allows the channel vehicle to enter the centering channel, wherein a clear span between the centering means decreases in the longitudinal direction of the centering channel. In embodiments, a clear span is measured in the transverse direction, i.e., horizontally and orthogonally to the longitudinal direction, wherein the clear span between the centering means decreases in the vertical direction, i.e., vertically and orthogonally to the longitudinal direction towards the running rail.

19 Claims, 6 Drawing Sheets

(58) Field of Classification Search
CPC .... B65G 2207/40; B65G 1/0414; B65G 1/02;
B65G 1/065; B65G 21/2054; B65G
1/0435; B65G 47/24; B65G 21/2072;
B65G 47/244; B65G 47/22; B65D 19/42;
B65D 19/0004; B07C 3/087; Y10T
29/49829; Y10T 29/5196; Y10T 29/5124;
Y10T 29/534; Y10T 29/53365; Y10T
29/53539; Y10T 29/53548; Y10T
29/5337; A47B 47/00
USPC ........ 211/162; 414/279, 284, 276, 334, 778,
414/780, 781, 782; 198/416, 345.1,
198/346.1, 346.2, 415, 452; 29/33 P;
228/49.4
See application file for complete search history.

(56) References Cited

U.S. PATENT DOCUMENTS

| | | | | |
|---|---|---|---|---|
| 3,817,406 A * | 6/1974 | Sawada | ............... | B65G 1/0414 414/281 |
| 3,830,359 A * | 8/1974 | Fogelberg | ............ | B65G 47/766 198/445 |
| 3,848,755 A * | 11/1974 | Bussienne | ............ | B65G 1/0414 414/284 |
| 4,004,677 A * | 1/1977 | Heier | ................... | B65G 47/681 198/452 |
| 4,304,521 A * | 12/1981 | Hammond | ............... | B65G 1/08 414/807 |
| 4,805,760 A * | 2/1989 | Treiber | .................. | B65G 47/22 198/456 |
| 5,967,728 A | 10/1999 | Gales | | |
| 6,863,173 B2 * | 3/2005 | Bennett | .................. | B65G 47/22 198/456 |
| 7,784,407 B2 * | 8/2010 | Di Rosa | ............ | B65G 1/0414 414/281 |
| 8,875,868 B2 * | 11/2014 | Auf der Maur | ......... | B65H 9/06 198/434 |
| 2005/0126883 A1 * | 6/2005 | Leisner | .................... | B23Q 3/18 198/345.1 |
| 2019/0352107 A1 * | 11/2019 | Klotz | .................... | B65G 57/22 |
| 2020/0283228 A1 | 9/2020 | Iellimo | | |
| 2020/0290806 A1 * | 9/2020 | Iellimo | .................. | B65G 1/065 |
| 2021/0403240 A1 * | 12/2021 | Kumar | ............ | G05B 19/41895 |

FOREIGN PATENT DOCUMENTS

| | | | | |
|---|---|---|---|---|
| DE | 20021029 U1 | | 3/2001 | |
| DE | 202008009975 U1 * | | 11/2008 | .............. B65G 1/02 |
| DE | 102010029566 A1 | | 12/2011 | |
| DE | 102013221392 A1 * | | 4/2015 | .............. B65G 1/08 |
| DE | 102016120869 A1 | | 11/2017 | |
| EP | 0197448 A1 * | | 10/1986 | ............. B65G 1/065 |
| EP | 1215139 A2 | | 6/2002 | |
| GB | 2576384 A * | | 2/2020 | ............. B65G 1/065 |
| KR | 101984508 B1 * | | 5/2019 | ............. B65G 47/52 |
| WO | 2009132687 A1 | | 11/2009 | |
| WO | WO-2011042265 A1 * | | 4/2011 | ........... B65G 1/0492 |
| WO | WO-2020040365 A1 * | | 2/2020 | ............. B65G 37/00 |

* cited by examiner

CENTERING STATION AND METHOD FOR HANDLING AT LEAST ONE LOAD CARRIER

CROSS-REFERENCE TO RELATED APPLICATIONS

This application claims priority to German Patent Application No. DE 10 2021 006 362.7, filed Dec. 28, 2021, the contents of which are hereby incorporated by reference in its entirety.

TECHNICAL FIELD

The disclosure relates to a centering station and a method for handling at least one load carrier.

BACKGROUND

Centering means, for example for rack storage, are known from the prior art. For example, US 2020/283228 A1, WO 2009 132 687 A1, and DE 10 2010 029 566 A1 show various centering means.

Among other things, an object of the present disclosure is to address disadvantages of the prior art.

SUMMARY

Aspects and features of the present disclosure may address one or more challenges associated with the prior art.

A centering station according to the present disclosure may be used to correct a position of a load carrier on a channel vehicle. The centering station may comprise a centering channel extending along a longitudinal direction. The centering channel may comprise at least one running rail for the channel vehicle extending along the longitudinal direction, and at least two centering means extending substantially along the longitudinal direction above the at least one running rail. The centering channel may comprise an entrance, which allows entry of the channel vehicle into the centering channel. A clear span between the centering means may decrease in the longitudinal direction of the centering channel. The clear span may be measured in the transverse direction, i.e. horizontally and orthogonally to the longitudinal direction. The clear span between the centering means may further decrease in the vertical direction, i.e. vertically and orthogonally to the longitudinal direction, towards the at least one running rail.

A decreasing clear span between the centering means in the longitudinal direction of the centering channel may be larger in the region of the entrance than in the region opposite the entrance. In the "longitudinal direction" preferably means in the positive longitudinal direction, which runs from the entrance to a region opposite the entrance.

A clear span between the centering means that decreases vertically and orthogonally to the longitudinal direction in the direction of the at least one running rail may be characterized by the fact that the clear span is smaller in a lower region near the running rail than in an upper region facing away from the running rail.

Embodiments of the centering station, such as described above, may be simple and inexpensive to manufacture and allow fast and efficient position correction, for example fast centering of the load carrier on the channel vehicle, with the aid of standard on-board resources of the channel vehicle, such as with the aid of a drive and/or a lifting mechanism. Such a drive may serve to move the channel vehicle along the running rails and usually comprises an electric motor. A lifting mechanism, such as mentioned above, may be used to lower and lift load carriers, whereby load carriers mounted on load carrier rails can be picked up and transported load carriers can be set down on such load carrier rails.

Embodiments of the present disclosure are suitable for channel storage systems with channels that are not operated in a single-sort mode. In such channels, rearrangements are necessary much more frequently than in channels operated in a single-sort mode. Since every relocation involves the risk of incorrect positioning, embodiments of the present disclosure enable smooth operation of channel storage systems with channels that are not operated in a sorted manner by simple and efficient correction of any incorrect positioning.

The clear span between the centering means can decrease continuously over the entire length of the centering channel.

Furthermore, embodiments are envisioned, according to which the clear span between centering means decreases only over a section of the centering means in the longitudinal direction. Such sections preferably do not run parallel to the longitudinal direction.

As mentioned above, the clear span between the centering means decreases in the longitudinal direction of the centering channel. In all embodiments of the present disclosure, a clear span between the centering means measured preferably at the same height with respect to the vertical direction is larger at the entrance of the centering channel than opposite the entrance.

However, embodiments are envisioned, in which the clear span between the centering means remains constant over certain sections in the longitudinal direction. Such sections with a constant clear span between the centering means preferably run parallel to the longitudinal direction.

If the clear span is greater in the region of the entrance than in the region opposite the entrance, embodiments are also envisioned, in which the clear span increases over small regions along the longitudinal direction. These regions are usually design or manufacturing related and preferably extend over less than 30% of the extent of the centering means in the longitudinal direction, more preferably over less than 20% of the extent of the centering means in the longitudinal direction, and further preferably over less than 10% of the extent of the centering means in the longitudinal direction.

Furthermore, as also mentioned above, the clear span between the centering means also decreases in the vertical direction towards the running rail. In all embodiments of the present disclosure, a clear span between the centering means, preferably measured at the same position with respect to the longitudinal direction, is smaller in a lower region, which is closest to the running rail than in an upper region, which is furthest from the running rail. However, embodiments are envisioned, in which the clear span between the centering means remains constant in the vertical direction over certain sections.

If this clear span is smaller in a region close to the running rail than in a region facing away from the running rail, embodiments are also envisioned in which the clear span increases over small regions along the vertical direction towards the running rail. These regions are typically design or manufacturing related and preferably extend over less than 30% of the vertical extent of the centering means, more preferably less than 20% of the vertical extent of the centering means, and further preferably less than 10% of the vertical extent of the centering means.

Correcting the position of the load carrier can preferably mean that the load carrier is aligned on the channel vehicle in such a way that the channel storage system can be operated properly without, for example, the load carrier hitting or tilting against any equipment within the channel storage system. Typically, correcting the position of the load carrier will correct any incorrect positioning of the load carrier on the channel vehicle.

The position of the load carrier can be corrected such as by rotating the load carrier and/or by shifting the load carrier horizontally. The displacement can also be referred to as centering. In some cases, the rotation and the horizontal displacement are also referred to collectively as centering.

The load carrier can be, for example, a pallet or a pallet cage. However, other load carriers are envisioned.

The channel vehicle is known and sometimes referred to as a "shuttle". Preferably, it is the channel vehicle of a channel storage system.

The channel vehicle and the channel storage system are not mandatory components of the centering station according to the disclosure. Furthermore, embodiments of the centering station according to the disclosure may be used in other racks or storage systems than the channel storage systems discussed below.

With the aid of the centering station according to the present disclosure, the desired position of the load carrier on the channel vehicle can be achieved by rotating the load carrier relative to the channel vehicle, or by moving the load carrier horizontally relative to the channel vehicle, or by a combination of the above operations.

If several running rails are present, they preferably run parallel to each other. For example, designs with exactly two rails may be considered.

In an embodiment, exactly two centering means are arranged in the centering channel. The centering means can run along an outer edge of the centering channel.

Since the clear span between the centering means decreases in the longitudinal direction of the centering channel, the centering means also only run essentially in the longitudinal direction and not completely parallel to the longitudinal direction. At least one of the centering means runs converging in longitudinal direction towards a center of the centering channel. It may also be contemplated that both centering means extend convergent toward the center of the centering channel. The region enclosed by the centering means thus tapers from the entrance of the centering channel toward the opposite end.

The centering channel may have two openings, and thus comprise an exit opposite the entrance. In this embodiment, the centering means preferably converge towards the exit.

The centering channel can also be designed or configured as a dead end. The alignment angles described in more detail below can be arranged at the end of this dead end.

The centering means may include sections adapted to contact the load carrier for the purpose of correcting a position of the load carrier on the channel vehicle, which sections may be formed in cross-section as a shape selected from the following list:
route
successive row of several routes
section of a branch of a parabola
circular arc
elliptical arc
successive row of at least two of the aforementioned forms.

The correction of the position of the load carrier on the channel vehicle may be a centering by changing a horizontal position of the load carrier on the channel vehicle. In addition, a pure rotation without changing the horizontal position of the load carrier represents a correction of the position of the load carrier within the context of the present disclosure.

In order to come into contact with the load carrier, the sections of the centering means can be arranged and aligned appropriately. In embodiments, the centering means or at least their sections may be arranged depending on a height of the channel vehicle and accordingly depending on a height position of the load carrier located thereon at a height that allows stepping into contact. Furthermore, the centering means or at least their sections may preferably be arranged laterally so close to the running rails that it is possible to step into contact with the load carrier.

The aforementioned sections of the centering means, which can come into contact with the load carrier, may preferably be those sections, such as surface sections of the centering means, which point towards the center of the centering channel and thus face each other. In addition to the design as surface sections, linear designs of the aforementioned sections of the centering means are also envisioned.

In embodiments, the centering channel comprises exactly two centering means. These are preferably arranged on opposite sides of the running rail and essentially in the longitudinal direction.

The centering means may have the same shape or different shapes.

The centering means may include sections adapted to contact the load carrier for correction of a position of the load carrier on the channel vehicle, which sections may be formed in longitudinal section as a shape selected from the following list:
route
successive row of several routes
section of a branch of a parabola
circular arc
elliptical arc
successive row of at least two of the aforementioned forms.

In all other respects, the explanations given above with regard to the shape in cross-section apply to the shape in longitudinal section.

At least one alignment angle can be provided in the centering channel at the end opposite the entrance.

The at least one alignment angle can serve as a stop and stopper. The at least one alignment angle may thus serve to correct the position of the load carrier, as may the centering means. The at least one alignment angle may be optional. Embodiments of the centering station without an alignment angle are also envisioned. For example, depending on the type and design of the centering means, the at least one alignment angle can be dispensed with. This may apply such as if the centering means alone allow position correction of the load carrier on the channel vehicle.

The at least one alignment angle preferably has a section, such as a surface section, which slopes towards the entrance. This can be in the form of a line or an arc or curve, as already described in detail above with regard to the centering means.

The centering means or at least sections of the centering means that are not formed parallel to the longitudinal direction can have an extension in the longitudinal direction of at least 400 millimeters. The centering means or the aforementioned sections can further have an extension in the longitudinal direction of at least 800 millimeters, 1200 millimeters or 1600 millimeters. Preferably, the clear span between the centering means decreases in the longitudinal direction over at least 400 millimeters, more preferably over 800 millimeters, more preferably over 1200 millimeters, more preferably over 1600 millimeters.

In embodiments of the centering station, particularly reliable position correction of numerous different types of incorrect positioning is possible from an extension in the longitudinal direction of at least 400 millimeters.

The centering station can comprise at least two load carrier rails for the load carrier running in the longitudinal direction. Load carrier rails are known from the prior art as load carrier elements for load carriers in channel storage systems. The centering station preferably comprises such load carrier rails, although embodiments without load carrier rails may also be envisaged. Both variants will be discussed in more detail in relation to the method according to the disclosure.

In addition to the centering station described above, one embodiment of the present disclosure also includes a channel storage system having a channel vehicle and a centering station as described above. There may also be multiple channel vehicles and multiple centering stations in the channel storage system.

For exact positioning within the centering station, the channel vehicle can include at least one sensor for detecting a position marking. Separate sensors can be used for this purpose, which serve exclusively for exact positioning. Alternatively, the sensors described in detail below can be used to detect the load carrier and, a need for position correction of the load carrier. The centering station can comprise at least one suitable position marker, which is described in more detail below in relation to the method.

In addition to the centering station described above and the channel storage system described above comprising such a centering station, the present disclosure also comprises a method described below for handling at least one load carrier. Aspects, features and details described with respect to the method are also applicable to the centering station and the channel storage system, and vice versa.

A method for handling at least one load carrier in a channel storage system comprising a channel vehicle includes the following steps:
the channel vehicle picks up the load carrier,
correcting the position of the load carrier on the channel vehicle in that the channel vehicle loaded with the load carrier enters this centering channel in the longitudinal direction through an entrance of a centering channel of a centering station,
wherein said centering channel comprises at least one longitudinally extending running rail for the channel vehicle, wherein the centering channel further comprises at least two centering means extending substantially longitudinally above the at least one running rail and/or at least one alignment angle arranged at the end opposite the entrance,
wherein the correction of the position is performed by contacting the load carrier with at least one of the centering means and/or at least one of the alignment angles.

The channel vehicle can pick up the load carrier at any location within the channel storage system and then drive to the centering station to correct the position. This also applies if the centering station is located far away from a storage location of the load carrier involved.

The centering station can be designed or configured as described above for the embodiments of the centering station according to the present disclosure.

The channel vehicle can actively pick up the load carrier, for example, by driving underneath the load carrier, which is mounted on load carrier rails, and picking it up with the aid of a lifting mechanism. Channel vehicles with lifting mechanisms are known, and the lifting mechanism is usually used to place the load carrier on the load carrier rails or to pick it up from there.

Furthermore, this pick-up can also take place passively, for example, by a forklift truck, stacker crane or the like placing the load carrier on the channel vehicle.

Correcting the position of the load carrier may consist in a rotation, i.e. a mere rotation of the load carrier with respect to the previous position on the channel vehicle, or in a shifting, in which case a horizontal position of the load carrier relative to the channel vehicle or relative to the previous position on the channel vehicle is also corrected.

According to a very simple embodiment of the method, the channel vehicle loaded with the load carrier enters the centering station. This can be done without any additional process steps and without any control or regulation interventions by simply driving the channel vehicle into the centering station up to the alignment angles or up to a predetermined position or over a predetermined distance. If the load carrier is incorrectly positioned, for example, twisted or displaced from the desired position, it will make contact with the centering means and/or come into contact with the alignment angles at the end of the centering channel as it enters or passes through the centering station. This coming into contact pushes and/or rotates the load carrier to the desired position. In this simple embodiment of the method, the position correction is primarily or exclusively effected by the longitudinally decreasing clear span of the centering means and/or the contact and preferably the shape of the alignment angles. Lowering or lifting of the load carrier is not necessary here.

The correction of the position of the load carrier on the channel vehicle, i.e. the position correction, can further and preferably be performed in such a way that the channel vehicle lowers the load carrier in the centering station at least once and preferably subsequently lifts it.

This lowering and raising is preferably performed by the lifting mechanism of the channel vehicle. Such a position correction can therefore take place with the lifting mechanism available as an on-board device in numerous channel vehicles and does not require any additional conversions or the like. Furthermore, the actual position correction is effected by the load carrier sliding along the centering means or sections of these centering means in a negative vertical direction (i.e. downwards), this sliding along being ultimately effected by gravity. A robust mode of operation is therefore ensured. The same applies preferably to a position correction at the alignment angles.

In this embodiment of the method, the position is corrected primarily or exclusively by the decreasing clear span of the centering means in the vertical direction downwards, i.e. towards the running rail. When the channel vehicle lowers the load carrier vertically, for example with the aid of the lifting mechanism, the load carrier comes into contact with the centering means in the case of improper positioning on the channel vehicle. After the initial contact with at least one of the centering means, the load carrier is shifted and/or rotated to the desired position during the further lowering process by the shaping of the centering means. Depending on the shape of the load carrier, at least one edge and/or at least one corner of the load carrier can come into contact with at least one of the centering means.

The lowering and lifting described above for the purpose of position correction can be performed in centering stations with or without load carrier rails. If there are no load carrier rails, the channel vehicle does not set down the load carrier at the end of the lowering process.

In centering stations without load carrier rails, the channel vehicle can lower the load carrier vertically over a predetermined distance, with the position being corrected as described above. The channel vehicle can then lift the load carrier again after it has been correctly positioned on its upper side, although this lifting is not absolutely necessary in centering stations without load carrier rails.

In centering stations with load carrier rails, the channel vehicle can lower the load carrier so that it is placed on the load carrier rails and then lift it again. Setting down on the load carrier rails preferably means that after this setting down and until it is lifted again, the load carrier is stored exclusively on the load carrier rails and no longer on the channel vehicle. In centering stations with load carrier rails, depending on the design and arrangement of the load carrier rails within the centering station, it may be necessary to lift the load carrier before it enters the centering station.

In all embodiments, the lowering and also the preferably subsequent lifting can take place while the channel vehicle is moving in the longitudinal direction of the centering channel, i.e. while it is moving. Preferably, however, the channel vehicle stops before lowering and lifting and only then starts moving again.

All variants of the above-described lowering and the preferably subsequent lifting can either take place only once after the channel vehicle has entered the centering station or, which is preferred, can take place several times in a row.

This allows the channel vehicle to enter the centering station a little further in the longitudinal direction after the load carrier has been lowered and lifted for the first time. The further the channel vehicle enters the centering station in the longitudinal direction, the smaller the clear span between the centering means, which decreases in the longitudinal direction as described above. The position can be corrected piece by piece by lowering the vehicle several times and then optionally raising it.

The piecewise position correction described above allows to use channel vehicles with very small stroke. For each lowering operation, one stroke over a vertical extension of the centering means can be sufficient.

If the load carrier is set down on the load carrier rails after each lowering process, as described in more detail below, a position correction and/or a plausibility check of a position of the channel vehicle detected by an encoder in the traction motor can be performed with the aid of position markers within the centering station after a final lowering and before a final lifting, as described in more detail below.

After the position of the load carrier and preferably the position of the channel vehicle has been successfully corrected, such as after a final lifting of the load carrier within the centering station, the channel vehicle can leave the centering station with the correctly positioned load carrier.

The channel vehicle loaded with the load carrier can enter a centering station having at least two longitudinally extending load carrier rails for the load carrier, wherein the channel vehicle can enter through the longitudinal entrance. Here, the channel vehicle can lower the load carrier at least once during entry into the centering station so that the load carrier is deposited on the load carrier rails. The channel vehicle can then lift the load carrier again. This has already been described above.

The channel vehicle loaded with the load carrier can enter a centering station in the longitudinal direction, the centering station having at least one alignment angle at the end opposite the entrance. The channel vehicle can enter the centering channel in such a way that the load carrier comes into contact with at least one alignment angle.

The channel vehicle can lower the load carrier immediately after contact has been established between the load carrier and at least one of the centering means. The lowering thus only takes place when contact between the load carrier and at least one of the centering means has been established. Preferably, the contact between the load carrier and one of the centering means is detected and then the lowering is triggered.

This contact can be detected directly or indirectly.

An indirect detection can be done by observing a load current and/or a torque of a traction motor of the channel vehicle. Both increase significantly when the channel vehicle is stopped or braked by an obstacle. If the torque and/or the load current exceed a predetermined value, this is taken as contact between the load carrier and at least one of the centering means and the aforementioned lowering process is triggered. The predetermined load current, the exceeding of which triggers the lowering process, can, for example, be 80% overcurrent, i.e. 180% of the load current considered normal.

If, for example, the load carrier on the channel vehicle comes into contact with the centering mean, the load current will increase, depending on a static frictional force between the load carrier and the upper side of the channel vehicle, even if only the load carrier and not the channel vehicle itself comes into contact with the centering mean.

Alternatively, a slowed movement or unplanned deceleration to an unplanned stop of the channel vehicle can be used as an indirect detection of coming into contact with the centering mean and trigger the lowering process. Such deceleration or stop may be caused by stepping into contact with a centering mean. Thus, it may be considered, for example, monitoring a speed of the channel vehicle.

Other alternatives for indirect detection are envisioned in connection with the disclosure.

Direct monitoring of the contact between the load carrier and the centering mean can be performed by sensors mounted at a suitable location near or inside the centering station and/or in or on the load carrier and/or on the channel vehicle. Usually, such sensors are arranged near or inside the centering station and/or on the channel vehicle. An arrangement of at least one sensor in or on the load carrier represents a rare embodiment example, which is nevertheless encompassed by the present disclosure.

Regardless of where the aforementioned sensors are located, mechanical sensors, resistive sensors, piezoelectric sensors, capacitive sensors, inductive sensors, optical sensors, acoustic sensors or magnetic sensors can be considered, for example. Optical sensors can be light scanners, for example, which can be set to a certain distance.

As described in detail above, lowering can occur after contact has been established between the load carrier and one of the centering means. Additionally or alternatively, lowering may occur within the centering station according to a predetermined scheme. If such a predetermined scheme is used, simpler constructed and thus often less expensive traction motors, controls and sensors can be used.

Lowering and lifting according to a fixed pattern can take place, for example, by the channel vehicle moving a predetermined distance in the longitudinal direction within the centering station, for example over 100 millimeters. This can be followed by lowering and lifting of the load carrier. This process may be repeated until the channel vehicle arrives at the end of the centering channel, which is located opposite the entrance. In general, then, it may be considered establishing a step size and limiting it over a maximum distance. This can, for example, replace or supplement the overcurrent measurement described above.

If a scheme as described above is to be implemented in addition to a detection of contact treading, it can be considered, for example, that the channel vehicle within the centering channel lowers the load carrier whenever a contact treading has been detected, but at the latest when the channel vehicle has moved over a predetermined distance in the longitudinal direction. This predetermined distance may be 200 millimeters, for example. In this embodiment, lowering and lifting would therefore take place at the latest every 200 millimeters, even if no contact between the load carrier and the centering mean is detected at all in the centering station.

The correction of the position of the load carrier on the channel vehicle by driving into the centering station can always take place when either a position correction is recognized as necessary or when a predetermined number of rearrangements have taken place. A control system can thus cause the channel vehicle to enter the centering channel whenever and preferably only when, it is deemed necessary.

The need for a position correction can be determined via suitable sensors. Here, too, mechanical sensors, resistive sensors, piezoelectric sensors, capacitive sensors, inductive sensors, optical sensors, acoustic sensors or magnetic sensors may be considered, for example. These sensors may be attached to the channel vehicle or somewhere in the channel storage system.

In this way, it can be considered that the channel vehicle, after picking up a load carrier, passes through a measuring station located in the channel storage system, which uses suitable sensors to determine whether a position correction is necessary. For example, a contour check of the load carrier can be performed, which can be combined with a contour check of the load on the load carrier.

If the channel vehicle contains at least one sensor by means of which the need for a position correction is to be determined, an optical sensor may be considered, for example. Such an optical sensor can be aligned and set up in such a way that it does not trigger or detect anything in the unloaded state and in the properly loaded state when the load carrier is in the desired position on the channel vehicle. However, if the load carrier moves beyond this desired position and into a detection range of the optical sensor due to a rotation and/or a displacement compared to the desired position on the channel vehicle, this can be detected by the optical sensor. The same principle can also be implemented with sensors that operate according to a different operating principle than optical sensors. It can be considered that the aforementioned sensor not only digitally detects the presence of an object in the detection region (object present/ object not present), but also detects the distance between sensor and object. Then it can be calculated if only the load carrier is protruding or if in fact the load carrier is outside the desired position.

In the context of the present disclosure, a relocation may be understood to mean any method in which the load carrier is moved by the channel vehicle from one location within the channel storage system to a second location within the channel storage system. The number of relocations of a load carrier that have taken place can be recorded by means of a suitable counter. Such relocations often lead to at least minor misplacements of the load carriers, both on the load carrier rails and on the channel vehicle. After a large number of relocations, even minor misalignments of the load carrier often add up to a significant misalignment that endangers proper operation and makes it necessary to correct the position.

It may be considered that for each load carrier equipped with a suitable identifier, for example, it is recorded how often it has been relocated or otherwise moved since the last position correction. The predetermined number of relocations or movements after which a position correction takes place can be, for example, five relocations. The exact number can be selected depending on the conditions prevailing in the channel storage system and the requirements for proper positioning of the load carriers, the type of load carriers, an assembly tolerance, and a design of the storage system.

It may be considered correctly positioning not only the load carrier but also the channel vehicle within the centering station, if necessary. Here, it may be considered that the channel vehicle detects a position marker arranged within the centering station. Suitable position markers may be codes, such as optically readable codes such as QR codes, bar codes, etc. Furthermore, other optically detectable position markings may also be considered, such as holes, elevations, dashes, etc. Correct positioning can alternatively be achieved with any suitable pairings of at least one sensor installed in the channel vehicle and at least one position marker arranged in the centering station. In addition to optical sensors, mechanical sensors, magnetic sensors, acoustic sensors, etc. may be considered. Usually, and preferably also in the context of the present disclosure, channel vehicles are initially positioned via an encoder in the traction motor, which ultimately counts rotations of the wheels. Due to slippage, changing wheel diameter, etc., it can happen that the specified conversion from the number of wheel rotations to the distance traveled is no longer correct. With the help of the position marker described above and the sensor in the channel vehicle, this problem can be overcome. The pairing of at least one of the sensors described above and at least one position marker in the centering station can thus correct the position of the channel vehicle determined based on the encoder data. A plausibility check is also possible.

The position of the channel vehicle can be corrected, for example, in such a way that the sensor described above detects the position marker described above and then checks whether the channel vehicle is in the desired position, for example at the desired distance, in relation to the position marker. If necessary, a correction of the position of the channel vehicle can be made.

The position of the channel vehicle can alternatively be corrected, for example, in such a way that the channel vehicle moves longitudinally at a suitable location within the centering station until the sensor described above detects the position marking described above. In this case, the detection of the position marker signals that the channel vehicle is correctly positioned.

If the method described above includes setting down the load carrier on the load carrier rails and then lifting it, the position correction of the channel vehicle with the aid of the at least one position marker is preferably performed after the last setting down of the load carrier and before the last lifting of the load carrier, i.e. preferably immediately before the channel vehicle leaves the centering station again with the correctly positioned load carrier.

Suitable control and regulating devices for channel vehicles as well as storage control systems for controlling all components of a channel storage system are known from the prior art. Such control and regulating devices can be used to control and regulate all process steps of the variants of the method according to the disclosure described above.

BRIEF DESCRIPTION OF THE DRAWINGS

Further advantages, features and details of the disclosure result from the following description of embodiment of centering stations as well as from the drawings.

For the purpose of clarity, not all features in all figures are provided with reference numbers.

A coordinate system is assigned to each of the figures. If a positive direction is mentioned, the direction in which the arrows of the coordinate system point is meant. If a negative direction is mentioned, the opposite direction is meant.

DETAILED DESCRIPTION

Figure 1:
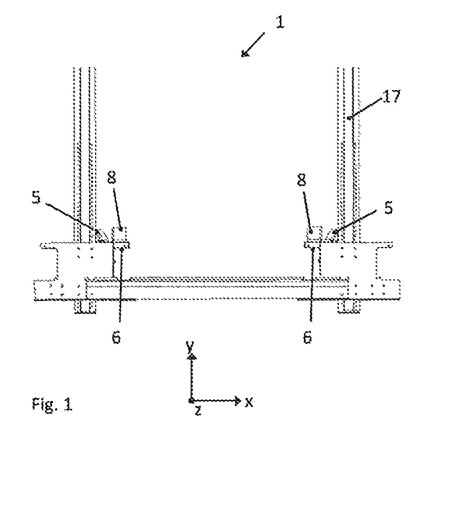
FIGS. 1 to 4 generally illustrate various views of a centering channel with and without a load carrier.

FIG. 1 shows a sectional view of the centering channel 1.

Figure 2:
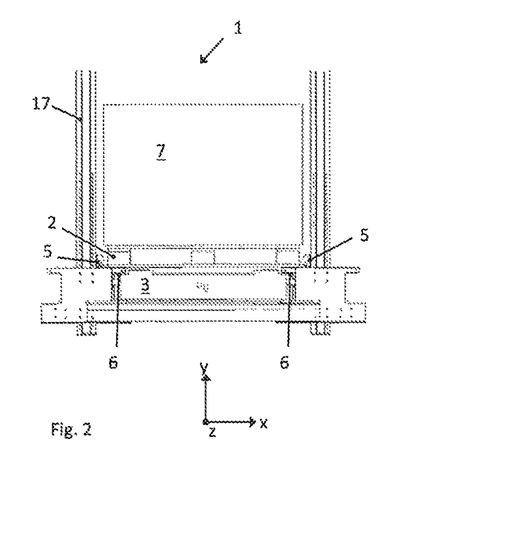

FIG. 2 shows the centering channel 1 according to FIG. 1, into which a loaded channel vehicle 3 has entered.

Figure 3:
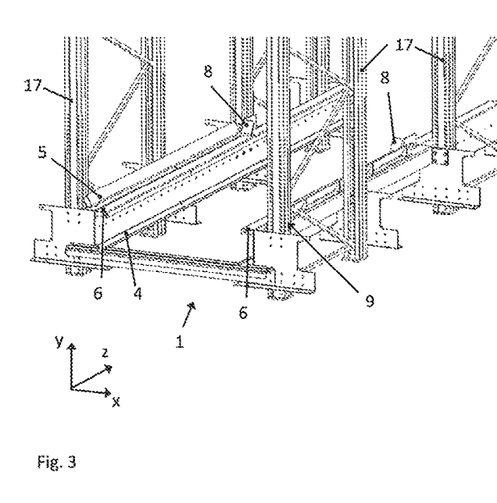
Figure 4:
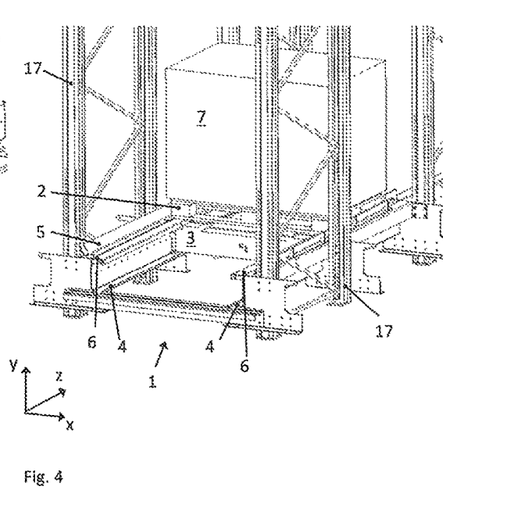

FIG. 3 shows the arrangement according to FIG. 1 in perspective view; FIG. 4 shows the arrangement according to FIG. 2 in perspective view.

FIGS. 4 to 17 are highly simplified schematic views showing individual aspects of embodiments of the present disclosure.

Figure 18:
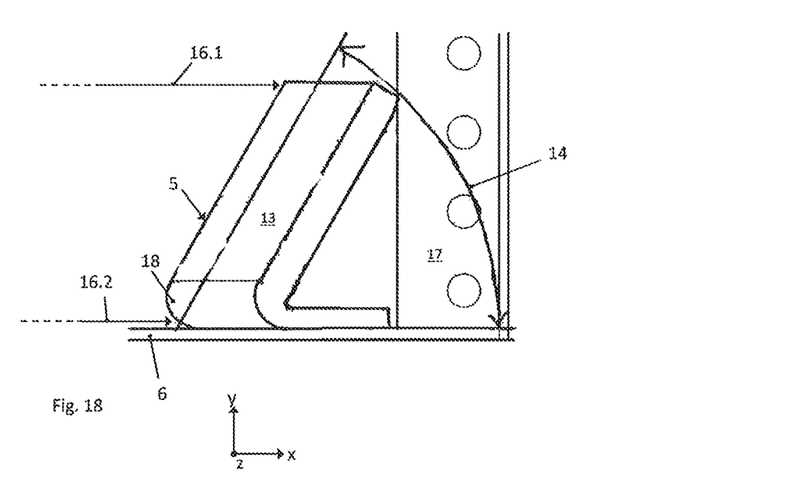
FIG. 18 shows a schematic perspective view of a centering means.

FIG. 18 shows a schematic perspective view of a centering means.

FIGS. 3 and 4 show that the centering channel 1 is similar to known channels of channel storage systems. In the embodiment shown, the centering channel 1 comprises, just like known channels, running rails 4 running parallel to each other and load carrier rails 6 running parallel to each other. In FIGS. 3 and 4, it can be seen that the centering means 5 run along an outer edge of the centering channel 1, immediately adjacent to rack posts 17 (also called "rack support").

FIGS. 1 to 4 and 9 to 18 clearly show that a clear span 16 measured in a transverse direction x between the centering means 5 decreases both in the longitudinal direction z and in the negative vertical direction y. The clear span 16 is shown in FIGS. 11 to 18 with the corresponding reference number. For the purpose of clarity, the clear span 16 is not shown in all figures, but only in FIGS. 11 and 18 with a corresponding reference number. However, this always refers to the clear span between the centering means 5 measured in the transverse direction x.

The negative vertical direction y here means towards the rails not shown in FIGS. 9 to 11, which are usually arranged below the load carrier rails 6. Sections 13 of the centering means 5, which can come into contact with the load carrier 2, are only shown separately in FIGS. 9, 12, 15, 16, 17 and 18. However, these sections 13 are also present on both sides in the embodiments according to FIGS. 10, 11, 13 and 14, but are not separately highlighted with reference numbers.

Figure 9:
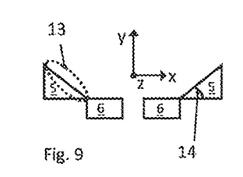
FIGS. 9 to 11, 15 and 17 schematically illustrate various cross-sections through load carrier rails and adjacent centering means, and FIGS, 12 to 14 and 16 generally illustrate various longitudinal sections through load carrier rails and adjacent a centering means.

In the embodiment shown in FIG. 9, the sections 13 of the centering means 5 are formed as lines/routes in cross-section, i.e. in the x-y plane. These centering means 5 could also be referred to as centering bevels. As indicated on the right side in FIG. 9, the section 13 formed as a line is inclined at an angle 14 to the transverse direction x, i.e. to a horizontal.

Figure 10:
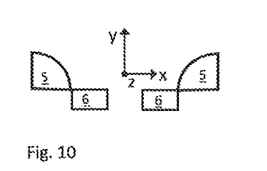
Figure 11:
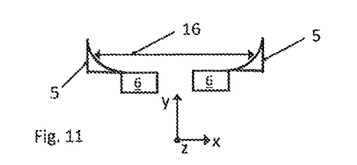

The sections of the centering means 5 corresponding to the sections 13 in FIG. 9 in FIGS. 10 and 11 are formed as circular arcs. For the purpose of clarity, these circular arc-shaped sections are not provided with the reference number 13.

Figure 12:
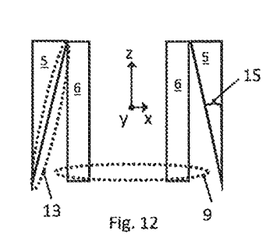

In FIG. 12, the sections 13 of the centering means 5 are formed as lines in longitudinal section, i.e. in the x-z plane.

Figure 13:
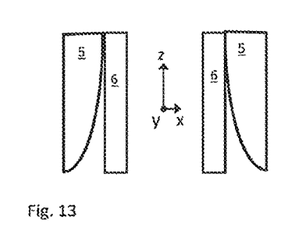
Figure 14:
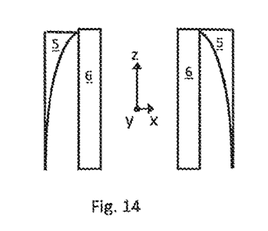

The sections of the centering means 5 corresponding to the sections 13 in FIG. 12 (not provided with reference numbers there) in FIGS. 13 and 14 are formed as branches of a parabola.

The sections of the centering means 5 (not provided with reference numbers there) which can come into contact with the load carrier 2 are convex in FIGS. 10 and 13, and concave in FIGS. 11 and 14.

Figure 15:
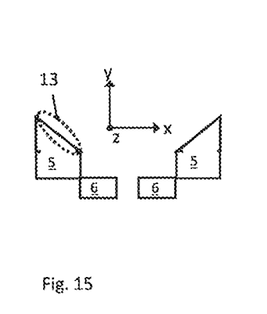

FIG. 15 shows exemplary that sections 13 converging in the negative vertical direction y (i.e. downwards), which serve to correct the position, do not have to extend in cross-section over the entire vertical direction y. The centering means 5 can also comprise sections, which run parallel to the vertical direction y. The centering means 5 can also include sections, which extend parallel to the vertical direction y. The centering means 5 can also include sections, which run parallel to the vertical direction y. In these sections running parallel to the vertical direction y, the clear span remains constant.

Figure 16:
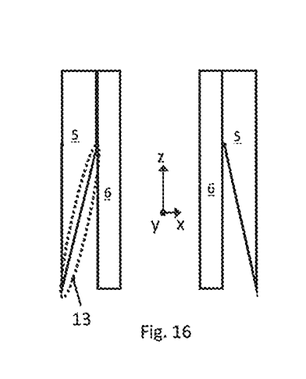

FIG. 16 shows exemplary that sections 13 converging in the longitudinal direction z, which serve to correct the position, do not have to extend over the entire longitudinal direction z in longitudinal section. The centering means 5 can also include sections that run parallel to the longitudinal direction z. In these sections running parallel to the longitudinal direction z, the clear span remains constant.

Figure 17:
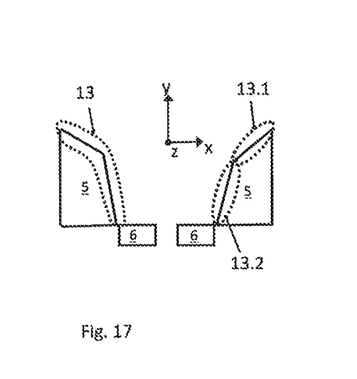

FIG. 17 shows exemplary that sections 13, which serve to correct the position, can also be represented in cross-section as a series of several shapes, in this case two sections. The clear span between the centering means 5 decreases continuously in the negative y-direction. Since a first section 13.1 has a smaller angle of inclination to the transverse direction x (i.e. to the horizontal) than a second section 13.2, the degree of this decrease in the clear span is greater in the region of the first section 13.1 than in the region of the second section 13.2.

Compared to FIGS. 9 to 14, the clear span between the centering means 5 thus does not continuously decrease over the entire negative vertical direction y or over the entire length of the centering channel 1 in the embodiments shown in FIGS. 15 and 16.

FIGS. 5 to 8 schematically show some possible erroneous positions of the load carrier 2 compared to the desired position 10. Here, "desired position 10" is preferably understood to mean the desired position 10 on the channel vehicle 3. FIGS. 5 to 8 are only intended to illustrate schematically how a displacement and/or a rotation of the load carrier 2 can be corrected compared to the desired position 10.

Figure 5:
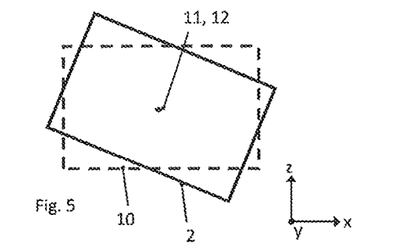
FIGS. 5 to 8 schematically illustrate various arrangements of a load carrier relative to a desired position.

In FIG. 5, a center point 11 of the load carrier 2 and a center point 12 of the desired position 10 are coincident. The mispositioning of the load carrier 2 in FIG. 5 thus consists exclusively of a rotation (here clockwise) in comparison to the desired position 10.

Figure 6:
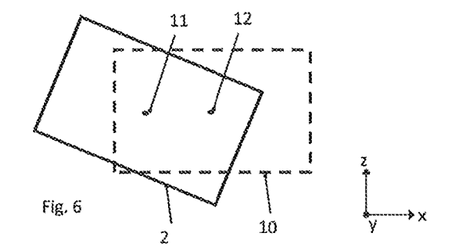

In FIG. 6, the mispositioning of the load carrier 2 consists of the rotation already shown in FIG. 5 and an additional displacement in the negative x-direction (transverse direction), i.e. to the left in FIG. 6.

Figure 7:
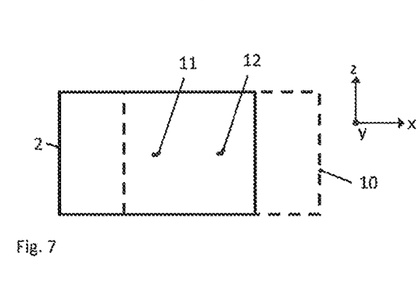

In FIG. 7, the mispositioning of the load carrier 2 consists exclusively in a displacement in the negative x-direction, i.e. to the left in FIG. 7.

Figure 8:
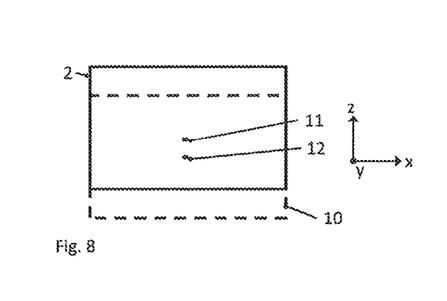

In FIG. 8, the mispositioning of the load carrier 2 consists exclusively in a displacement in longitudinal direction z, i.e. upwards in FIG. 8.

Usually, a effective direction of a gravitational force is in a negative vertical direction y, and a horizontal plane is preferably the x-z plane. Surfaces of running rails 4 and load carrier rails 6, which can come into contact with wheels of the channel vehicle 3 or carry and support the load carrier 2, preferably run parallel to the horizontal plane.

An arrow of the coordinate system indicating the longitudinal direction z runs in FIGS. 12 to 14 through a center of the centering channel indicated there only schematically by the arrangement of the centering means 5 and load carrier rails 6.

FIGS. 1 and 3 show that alignment angles 8 or a straight line connecting these alignment angles 8 run essentially transversely to the longitudinal direction z, i.e., in the transverse direction x. The alignment angles 8 form, so to speak, the end of a centering channel 1 configured as a dead end.

The angle 14 shown in FIG. 9 can be between 45° and 85°.

The angle 15 shown in FIG. 12 can be between 0.1° and 10°.

The centering means 5 shown in FIGS. 3 and 4 can have an extension in the longitudinal direction of, for example, about 1600 millimeters, which corresponds to twice the width of a pallet. Thus, two transversely oriented pallets could be accommodated one behind the other in a centering station dimensioned in this way.

The sections of the centering means 5 in the embodiment according to FIG. 13 that come into contact with the load carrier 2 are shaped like branches of a parabola that is open at the top. The corresponding sections of the centering means 5 in the embodiment according to FIG. 14 are shaped like branches of a downwardly open parabola.

In FIG. 18, a centering mean 5 is shown in detail, the load carrier rail 6 is only vaguely shown. Furthermore, the rack post 17 and the angle 14 between the transverse direction x and the section 13 of the centering mean 5 can be seen. In FIG. 18 it can be clearly seen that the section 13 constitutes the essential part of the centering mean 5 which can come into contact with the load carrier 2. However, due to design and manufacturing, a bent section 18 exists below the section 13. In negative vertical direction y, in FIG. 18 as downward, the clear span 16 increases along this bent section 18 towards the load carrier rail 6. However, this does not affect the position correction since the vertical extent of section 18 is negligible compared to the vertical extent of section 13. Furthermore, the clear span 16.2 in the lowermost region where the bent section 18 is in contact with the load carrier rail 6 is significantly smaller than the clear span 16.1 in the opposite uppermost region.

With reference to FIGS. 1 to 18, a mode of operation of the centering station according to an embodiment of the disclosure may be explained as follows:

The channel vehicle 3, which is loaded with the load carrier 2, moves into the centering channel 1 for the purpose of position correction on the running rails 4. In the example shown, the load carrier 2 is a pallet loaded with a load 7.

The position correction takes place in the manner already described in detail in the preceding section "Solution of the task" and is therefore explained below only briefly with reference to the figures.

The channel vehicle 3 moves into the centering channel 1 for the purpose of position correction.

If the load carrier 2 is incorrectly positioned as shown in FIG. 7, it can be corrected in two ways in the centering channel 1.

Firstly, the load carrier 2 can be brought into the desired position in the centering channel 1 (which is sometimes referred to as "centering") by the channel vehicle 3 lowering it in a negative vertical direction y so that it can slide along sections 13 of the centering means 5 in a negative vertical direction y. In this regard, reference is made to FIGS. 9, 15, 17 and 18, where such sections 13 are indicated by way of example. Thus, with reference to FIG. 7, an edge of the load carrier 2 shown on the left and extending substantially in the longitudinal direction z comes into contact with the section 13 of the centering mean 5. When the load carrier 2 is lowered in a negative vertical direction y, the load carrier 2 is displaced in a positive x-direction, i.e. to the right, by sliding along the section 13 of the centering mean 5 shown on the left in FIGS. 9, 15 and 17.

On the other hand, the position correction can take place while the channel vehicle 3 passes the centering channel 1 in the longitudinal direction z, whereby an upper left corner of the above-mentioned edge of the load carrier 2 visible in FIG. 7 comes into contact, for example, with the section 13 shown in FIG. 12.

In both cases, the load carrier 2 shown in FIG. 7, which is undesirably too far to the left, would be centered by a displacement to the right, i.e. in the positive x-direction.

The aforementioned operating principles of the position correction can be applied individually or in combination as well as consecutively or simultaneously. If the channel vehicle 3 stops within the centering channel 1 in order to lower the load carrier 2 as described, the operating principle of the position correction described with reference to FIG. 9 is effective. If the channel vehicle 3 passes through the centering channel 1 without stopping, the operating principle described with reference to FIG. 12 takes effect.

If the channel vehicle 3 first passes through the centering channel 1 over a certain distance, the operating principle described with reference to FIG. 12 can initially come into effect. If the channel vehicle 3 then stops to lower the load carrier 2, the operating principle described with reference to FIG. 9 then comes into effect. If, however, the channel vehicle 3 does not stop to lower the load carrier 2, but instead lowers it in the opposite vertical direction y while passing in the longitudinal direction z, both of the aforementioned operating principles are used simultaneously.

The operating principle described with reference to FIG. 9 may also come into effect if the centering means 5 are configured such as shown in FIG. 10, 11, 15, 17 or 18.

The operating principle described with reference to FIG. 12 may also apply if the centering means 5 are configured such as shown in FIG. 13, 14 or 16.

If the incorrect positioning of the load carrier 2 shown in FIG. 5 is given, this can be corrected in essentially the same way as described above in relation to FIG. 7. In this case, the lower left corner of the load carrier 2 visible in FIG. 5, which projects outwards to the left in the negative x-direction (transverse direction) beyond the desired position 10, and the upper right corner of the load carrier 2, which projects outwards to the right in the positive x-direction (transverse direction) beyond the desired position 10, will normally come into contact with the sections 13 of the centering means 5. This coming into contact then causes the position correction in the manner already described with regard to FIG. 7. When the load carrier 2 is lowered in a negative vertical direction y, the load carrier 2 would perform a counterclockwise rotation by sliding along the sections 13 of the centering means 5. This position correction by counterclockwise rotation occurs until an outline of the load carrier 2 shown in FIG. 5 coincides with the desired position 10.

If the incorrect positioning of the load carrier 2 shown in FIG. 6 is given, it can be corrected in substantially the same way as described above in relation to FIGS. 5 and 7. In this case, usually the edge of the load carrier 2 shown on the left in FIG. 6 and/or at least one of the two corners adjacent to this edge will come into contact with the section 13 of the centering mean 5 in order to perform the position correction. When the load carrier 2 is lowered in the negative y-direction, it is then rotated counterclockwise and displaced in the positive x-direction, i.e. to the right in FIG. 6, until the load carrier 2 is in the desired position 10.

If the incorrect positioning shown in FIG. 8 is given, it can be corrected by coming into contact with the alignment angles 8. The same applies to any mispositioning where at least part of the load carrier 2 protrudes beyond the desired position 10 in the longitudinal direction z, which is the case in the schematic examples of FIGS. 5 and 6. However, in the examples according to FIGS. 5 and 6, essentially only a position correction of the load carrier in negative longitudinal direction z can be made by coming into contact with the alignment angles 8. A correction in the transverse direction x, which is also necessary in the examples according to these figures, usually requires stepping into contact with at least one centering mean 5.

FIG. 3 shows that the alignment angles 8 are configured to slope in the negative longitudinal direction z, i.e. towards the entrance. In a cross-section lying in the y-z plane, the alignment angles 8 shown in FIG. 3 are thus similar or identical to the centering means 5 in a cross-section in the y-x plane. A position correction of the load carrier 2 that is incorrectly positioned according to FIG. 8 can be performed, for example, by the channel vehicle moving into the centering channel 1 in the longitudinal direction z to such an extent that the upper edge of the load carrier 2 visible in FIG. 8, which runs parallel to the x-axis, comes into contact with the alignment angles 8 and the load carrier 2 is displaced by this contact on the channel vehicle in the negative z-direction in such a way that it comes to rest in the desired position 10. In addition or alternatively, the channel vehicle 3 can lower the load carrier 2 immediately before the alignment angles 8 or after first coming into contact with the alignment angles 8, so that the aforementioned upper edge of the load carrier 2 shown in FIG. 8 slides along the alignment angles 8 during the lowering process and is moved to the desired position 10 by this sliding.

Although only some embodiments of the disclosure have been described and illustrated, it is apparent that the skilled person can add numerous modifications without departing from the essence and scope of the disclosure. The following modifications and variations may be considered:

Several channel vehicles 3 and/or several centering stations can be used in a channel storage system.

As can be seen from FIGS. 9 to 17, the centering means 5 can be mirror-symmetrical in cross-section with respect to the vertical axis y and mirror-symmetrical in longitudinal section with respect to the longitudinal axis z. This preferably applies to all embodiments shown in FIGS. 1 to 18. However, it may also be considered designing the two centering means 5 of a centering station differently. The shapes of the centering means 5 shown in FIGS. 9 to 17 can be combined. Thus, in a centering station, a centering mean 5 with a section 13 in the form of a line can be arranged on one side opposite a centering mean 5 with a section 13 in the form of an arc.

Furthermore, the cross-sections shown in FIGS. 9, 10, 11, 15 and 17, as well as the embodiment shown in FIG. 18, can be combined as desired with the longitudinal sections shown in FIGS. 12, 13, 14 and 16.

Instead of the convex or concave circular arcs shown in FIGS. 10 and 11, the sections 13 of the centering means 5 can also have other curve shapes, and for example be formed as elliptical arcs or in the form of branches of a parabola or in the form of a section of such a parabolic branch.

The same applies to the longitudinal sections shown in FIGS. 13 and 14.

In each case, any curved curves may be considered, as long as the clear span 16 in the negative vertical direction y, i.e., downward, and along the positive longitudinal direction z, i.e., rearward toward the end of the centering channel 1, preferably becomes smaller or remains constant over at least 70% of the clear span in the negative vertical direction y (i.e., downward) and preferably over at least 70% of the clear span in the longitudinal direction, i.e., rearward toward the end of the centering channel 1. Preferably, the aforementioned values are at least 80% of the respectively mentioned extension, even more preferably at least 90%.

Embodiments of the centering station without load carrier rails 6 are also contemplated.

Embodiments of the present disclosure comprise primarily only the centering station shown in the figures. According to further embodiments, the present disclosure may also comprise a channel storage system and at least one channel vehicle 3.

An extension of the centering means 5 in the longitudinal direction z, and thus preferably also an extension of the centering channel 1 in the longitudinal direction z, may be more or less than 1600 millimeters. Thus, an extension in longitudinal direction z of at least 400 millimeters, at least 800 millimeters, at least 1200 millimeters, at least 1600 millimeters, at least 2000 millimeters or at least 2400 millimeters can be considered.

The incorrect positioning shown in FIG. 8 can also be corrected, as an alternative or in addition to coming into contact with the alignment angles 8, by the channel vehicle 3 setting down the load carrier 2 on the load carrier rails 6 and then moving forward in the longitudinal direction z until the load carrier 2 is in the desired position 10. The channel vehicle 3 can then pick up the load carrier 2 again.

The sections 13 may be configured as surface sections. Line-shaped designs and a series of such line-shaped sections or the like are alternatively envisioned.

If the centering station comprises alignment angles 8, there may be exactly one alignment angle 8, two alignment angles 8 or several alignment angles 8.

A coming into contact between the load carrier 2 and the at least one alignment angle 8 can be detected by means of sensors, as has been described with regard to a coming into contact between the load carrier 2 and the centering mean 5.

The at least one alignment angle 8 can be formed as has been described with respect to the centering mean 5. Thus, for example, any curve shapes or series of shapes are envisioned.

However, according to a simple embodiment, it can also be considered that the at least one alignment angle 8 is parallel to the x-y plane. Such an alignment angle 8 does not allow any position correction by means of the aforementioned sliding along the longitudinal axis. However, a position correction can be made by moving the channel vehicle 3 into the centering channel 1 in the longitudinal direction z (i.e., in the positive z-direction) to such an extent that the load carrier 2 comes into contact with the alignment angle 8 and is thereby displaced in the negative longitudinal direction z on the channel vehicle 3.

The angle 14 shown in FIG. 9 can also be between 50° and 80° or between 55° and 70°. An angle between 55° and 65° may be preferred, for example, the angle may be about 60°.

An angle 15 shown in FIG. 12 can be between 0.1° and 10°. With embodiments, more preferred are angles between 0.1° and 5°, even more preferred between 0.2° and 4°, even more preferred between 0.3° and 3°, more preferred between 0.5° and 2°, more preferred between 0.7° and 1°, especially preferred angles of about 0.8°, for example 0.77°.

In the embodiment shown in FIG. 17, the upper section 13.1 can have an angle to the transverse direction x of, for example, 50° to 60°. The lower section 13.2 can have an angle to the transverse direction x of, for example, 60° to 70°. The section 13.1 can have an angle of about 55° to the transverse direction x, for example, and the lower section 13.2 can have an angle to the transverse direction x of 65°.

The centering channel 1 preferably, but not necessarily in all embodiments, comprises the region lying between and thus within the rack posts 17 partially provided with reference numbers in FIGS. 3 and 4.

With reference to FIGS. 5 to 8, it should be mentioned that all combinations of the incorrect positioning shown schematically there can be corrected with the aid of the centering station and the method described. This applies, for example, to incorrect positioning in the form of any combination of clockwise or counterclockwise rotation, which can be combined with displacement in the x- or z-direction.

If no alignment angles 8 are given, the channel vehicle 3 can cross the centering channel 1, and leave it at an exit opposite the entrance 9 after performing the position correction. If alignment angles 8 are given, the channel vehicle 3 leaves the centering channel 1 in a negative longitudinal direction z.

With regard to the coordinate system drawn in the figures in each case, the following should be noted: in conventional channel storage systems, the longitudinal direction of the channels is denoted by z and a longitudinal direction of lanes running orthogonally to the channels is denoted by x. The centering station shown in the figures is thus arranged and oriented orthogonally to the aisles of a channel storage system. Of course, it is equally envisioned to arrange the centering station, for example, at the end of an aisle, so that the longitudinal direction of the centering channel is in the x-direction with respect to the usual directional designations in channel storage systems.

With regard to the bent section 18 in FIG. 18, it should be noted in general that the clear span 16 can also increase both in the longitudinal direction z and in the negative vertical direction y over certain regions, due to a design or manufacturing process. In cases, however, the clear span 16 is preferably always smaller in the lowermost region with respect to the negative vertical direction y and in the rearmost region (i.e. opposite the entrance 9) with respect to the longitudinal direction z than in the uppermost region (i.e. facing away from the rails 4) with respect to the negative vertical direction y and in the region of the entrance 9 with respect to the longitudinal direction z.

The invention claimed is:

1. A centering station for correcting a position of a load carrier on a channel vehicle, the centering station comprising:
   a centering channel extending along a longitudinal direction,
   the centering channel comprising at least one running rail for said channel vehicle running in the longitudinal direction, and at least two centering means extending substantially in the longitudinal direction above the at least one running rail,
   wherein the centering channel comprises an entrance which allows an entry of the channel vehicle into the centering channel,
   wherein a clear span between the centering means decreases in a longitudinal direction of the centering channel,
   wherein the clear span is provided in a transverse direction that is horizontal and orthogonal to the longitudinal direction,
   wherein the clear span between the centering means decreases in a vertical direction that is vertical and orthogonal to the longitudinal direction towards the at least one running rail;
   wherein the load carrier comprises a pallet or pallet cage; the position of the pallet or pallet cage is correctable by the centering station via a rotation and/or a shifting of a horizontal position relative to the channel vehicle or relative to a previous position on the channel vehicle; and the decreasing of the clear span in both the longitudinal and vertical direction permits centering of the load carrier with or without lifting and lowering the load carrier; and
   wherein the centering means comprise sections adapted to contact the load carrier for correction of a position of the load carrier on the channel vehicle, wherein the sections are formed in cross-section as a shape selected from the following:
   line,
   successive row of several routes,
   section of a branch of a parabola,
   circular arc,
   elliptical arc, and
   successive row of at least two of the aforementioned shapes.

2. The centering station according to claim 1, wherein the centering means comprise sections adapted to come into contact with the load carrier for correcting the position of the load carrier on the channel vehicle, wherein the sections are formed in longitudinal section as a shape selected from the following:
   line,
   successive row of several routes,
   section of a branch of a parabola,
   circular arc,
   elliptical arc, and
   successive row of at least two of the aforementioned shapes.

3. The centering station according to claim 1, wherein at least one alignment angle is provided in the centering channel at an end opposite the entrance.

4. The centering station according to claim 2, wherein the centering means or at least sections of the centering means which are not formed parallel to the longitudinal direction have an extension in the longitudinal direction of at least 400 millimeters.

5. The centering station according to claim 1, wherein at least two load carrier rails run in longitudinal direction for the load carrier.

6. A channel storage system comprising a channel vehicle and a centering station according to claim 1.

7. A method for operating at least one load carrier in a channel storage system comprising a channel vehicle, the method comprising:
having the channel vehicle pick up the load carrier,
correcting a position of the load carrier on the channel vehicle, in that the channel vehicle loaded with the load carrier enters this centering channel in a longitudinal direction through an entrance of a centering channel of a centering station, and
correcting a position of the load carrier in a vertical direction,
wherein said centering channel comprises at least one running rail for the channel vehicle running in the longitudinal direction, wherein the centering channel further comprises at least two centering means running substantially in longitudinal direction above the at least one running rail and/or at least one alignment angle arranged at an end opposite the entrance,
wherein the correction of the position is effected by the load carrier coming into contact with at least one of the centering means and/or at least one of the alignment angles,
wherein the position of the load carrier is effected via a rotation and/or a shifting of a horizontal position relative to the channel vehicle or relative to a previous position on the channel vehicle; such that the load carrier is centered in both the longitudinal direction and vertical direction, and
wherein the correction of the position of the load carrier on the channel vehicle by driving into the centering station takes place when either a position correction is recognized as necessary or a predetermined number of rearrangements has taken place.

8. The method according to claim 7, wherein the centering station comprises the centering station according to claim 1.

9. The method according to claim 7, wherein the correction of the position of the load carrier on the channel vehicle takes place such that the channel vehicle lowers the load carrier in the centering station at least once and subsequently lifts it.

10. The method according to claim 9, wherein the channel vehicle loaded with the load carrier enters a centering station through the entrance in the longitudinal direction, wherein the channel vehicle lowers the load carrier during entry into the centering station at least once to such an extent that the load carrier is deposited on load carrier rails, and wherein the channel vehicle subsequently lifts the load carrier again.

11. The method according to claim 7, wherein the channel vehicle loaded with the load carrier enters a centering station through the entrance in the longitudinal direction, wherein the channel vehicle enters the centering channel such that the load carrier comes into contact with at least one alignment angle.

12. The method according to claim 9, wherein the channel vehicle lowers the load carrier after contact between the load carrier and at least one of the at least two centering means.

13. The method according to claim 9, wherein the channel vehicle lowers the load carrier immediately after contact between the load carrier and at least one of the at least two centering means.

14. The centering station according to claim 1, wherein, the centering means is substantially fixed and non-moving with respect to the centering channel.

15. A centering station for correcting a position of a load carrier on a channel vehicle, the centering station comprising:
a centering channel extending along a longitudinal direction,
the centering channel comprising at least one running rail for said channel vehicle running in the longitudinal direction, and at least two centering means extending substantially in the longitudinal direction above the at least one running rail,
wherein the centering channel comprises an entrance which allows an entry of the channel vehicle into the centering channel,
wherein a clear span between the centering means decreases in a longitudinal direction of the centering channel,
wherein the clear span is provided in a transverse direction that is horizontal and orthogonal to the longitudinal direction,
wherein the clear span between the centering means decreases in a vertical direction that is vertical and orthogonal to the longitudinal direction towards the at least one running rail;
wherein the load carrier comprises a pallet or pallet cage; the position of the pallet or pallet cage is correctable by the centering station via a rotation and/or a shifting of a horizontal position relative to the channel vehicle or relative to a previous position on the channel vehicle; and the decreasing of the clear span in both the longitudinal and vertical direction permits centering of the load carrier with or without lifting and lowering the load carrier; and
wherein the centering means comprise sections adapted to come into contact with the load carrier for correcting the position of the load carrier on the channel vehicle, wherein the sections are formed in longitudinal section as a shape selected from the following:
line,
successive row of several routes,
section of a branch of a parabola,
circular arc,
elliptical arc, and
successive row of at least two of the aforementioned shapes.

16. The centering station according to claim 15, wherein at least one alignment angle is provided in the centering channel at an end opposite the entrance.

17. The centering station according to claim 15, wherein the centering means or at least sections of the centering means which are not formed parallel to the longitudinal direction have an extension in the longitudinal direction of at least 400 millimeters.

18. The centering station according to claim 15, wherein at least two load carrier rails run in longitudinal direction for the load carrier.

19. A channel storage system comprising a channel vehicle and a centering station according to claim 15.

* * * * *